US010268892B1

(12) United States Patent
Miller et al.

(10) Patent No.: US 10,268,892 B1
(45) Date of Patent: Apr. 23, 2019

(54) SYSTEM AND METHODS FOR VOLUME DIMENSIONING FOR SUPPLY CHAINS AND SHELF SETS

(71) Applicant: 4DMobile LLC, Hiawatha, IA (US)

(72) Inventors: Matthew Miller, Cedar Rapids, IA (US); Steven R. Kunert, Cedar Rapids, IA (US); Craig McDermott, Cedar Rapids, IA (US); Josh Berry, Cedar Rapids, IA (US); Jon Rasmussen, Mt. Vernon, IA (US)

(73) Assignee: 4DMOBILE LLC, Hiawatha, IA (US)

( * ) Notice: Subject to any disclaimer, the term of this patent is extended or adjusted under 35 U.S.C. 154(b) by 41 days.

(21) Appl. No.: 15/156,149

(22) Filed: May 16, 2016

Related U.S. Application Data

(60) Provisional application No. 62/162,480, filed on May 15, 2015.

(51) Int. Cl.
| | |
|---|---|
| *G06Q 10/00* | (2012.01) |
| *G06K 9/00* | (2006.01) |
| *H04N 5/232* | (2006.01) |
| *G03H 1/00* | (2006.01) |
| *G06K 9/62* | (2006.01) |
| *G06T 7/62* | (2017.01) |
| *G06T 15/08* | (2011.01) |
| *G06Q 10/08* | (2012.01) |

(Continued)

(52) U.S. Cl.
CPC ....... *G06K 9/00671* (2013.01); *G03H 1/0005* (2013.01); *G06F 17/30244* (2013.01); *G06K 9/6202* (2013.01); *G06Q 10/083* (2013.01); *G06Q 10/087* (2013.01); *G06T 7/62* (2017.01); *G06T 15/08* (2013.01); *H04N 5/23216* (2013.01); *H04N 13/204* (2018.05); *H04N 13/296* (2018.05); *G06F 3/013* (2013.01); *G06F 3/017* (2013.01); *G06F 3/04817* (2013.01); *G06F 3/04886* (2013.01); *G06F 3/167* (2013.01); *G06T 2207/10028* (2013.01)

(58) Field of Classification Search
CPC ........ B82Y 15/00; G06F 17/302; G06Q 10/08
See application file for complete search history.

(56) References Cited

U.S. PATENT DOCUMENTS

| | | |
|---|---|---|
| 5,117,098 A | 5/1992 | Swartz |
| 5,329,106 A | 7/1994 | Hone et al. |

(Continued)

OTHER PUBLICATIONS

Internet NPL search log (Year: 2018).*
Toward scalable System for Big data analytics; Hu et al; Apr. 2014 (Year: 2014).*

*Primary Examiner* — Luis Perez-Fuentes
(74) *Attorney, Agent, or Firm* — Suiter Swantz pc llo

(57) ABSTRACT

A system and related methods for volume dimensioning may be implemented by a smartphone, pad, tablet, or similar mobile computing device configured with a three-dimensional imaging system. The system may recognize the edges and corners of an object and infer its dimensions, from which a volume and dimensional weight can be calculated. The system may utilize the determined dimensions to allocate shipping resources to most efficiently and safely transport a shipment through a supply chain, assess damage to an object, assess the compliance of carry-on baggage to size requirements, and quickly assess the stocking of a retailer's and a competitor's products.

16 Claims, 15 Drawing Sheets

(51) Int. Cl.
*G06F 17/30* (2006.01)
*H04N 13/204* (2018.01)
*H04N 13/296* (2018.01)
G06F 3/0481 (2013.01)
G06F 3/0488 (2013.01)
G06F 3/01 (2006.01)
G06F 3/16 (2006.01)

(56) References Cited

U.S. PATENT DOCUMENTS

| | | | | |
|---|---|---|---|---|
| 6,947,571 | B1 * | 9/2005 | Rhoads | G06Q 30/02 |
| | | | | 382/100 |
| 8,239,229 | B1 * | 8/2012 | Paiz | G06Q 10/083 |
| | | | | 705/7.11 |
| 8,755,837 | B2 * | 6/2014 | Rhoads | G06F 17/30244 |
| | | | | 455/556.1 |
| 2002/0014533 | A1 * | 2/2002 | Zhu | B82Y 15/00 |
| | | | | 235/472.01 |
| 2004/0022444 | A1 * | 2/2004 | Rhoads | G06K 9/00577 |
| | | | | 382/232 |
| 2004/0190092 | A1 * | 9/2004 | Silverbrook | G06F 3/03545 |
| | | | | 358/539 |
| 2009/0267895 | A1 * | 10/2009 | Bunch | G06F 3/0386 |
| | | | | 345/157 |
| 2012/0268606 | A1 * | 10/2012 | Liu | G06Q 10/06 |
| | | | | 348/159 |
| 2013/0273968 | A1 * | 10/2013 | Rhoads | G06F 17/30244 |
| | | | | 455/556.1 |

* cited by examiner

218 — Generating at least one of a restocking alert, a restocking order, and an inventory report based on the object data

220 — Generating, via the at least one processor, at least one of a 3D model of the first object and a holographic image of the first object based on one or more of the at least one image and the distance information

222 — Displaying the at least one holographic image via at least one augmented reality device wirelessly connected to the mobile computing device 224 — Detecting, via the at least one augmented reality device, at least one of an eye movement of the user, a gesture of the user, and an audio command 226 — Adjusting the at least one holographic image based on at least one of the eye movement, the gesture, and the audio command

FIG. 8D

SYSTEM AND METHODS FOR VOLUME DIMENSIONING FOR SUPPLY CHAINS AND SHELF SETS

CROSS-REFERENCE TO RELATED APPLICATIONS

This application claims priority under 35 U.S.C. § 119(e) to provisional U.S. Patent Application Ser. No. 62/162,480, filed on May 15, 2015. This application is related to U.S. patent application Ser. No. 15/156,081, filed on May 16, 2016, and Ser. No. 15/156,107, filed on May 16, 2016. Said provisional U.S. Patent Application 62/162,480 and related U.S. patent application Ser. Nos. 15/156,081 and 15/156,107 are herein incorporated by reference in their entirety.

BACKGROUND

While many smartphones, pads, tablets, and other mobile computing devices are equipped with front-facing or rear-facing cameras, these devices may now be equipped with three-dimensional imaging systems incorporating cameras configured to detect infrared radiation combined with an infrared illuminator to enable the camera to derive depth information. It may be desirable for a mobile device to capture 3D images of objects, or two-dimensional images with depth information, and derive from the captured imagery additional information about the objects portrayed, such as the dimensions of the objects or other details otherwise accessible through visual comprehension, such as significant markings, encoded information, or visible damage.

SUMMARY

In a first aspect, embodiments of the inventive concepts disclosed herein are directed to a system for volume dimensioning of packages, shipments, and other similar objects traveling through a supply chain or displayed for sale by a retail establishment. The system may include a mobile computing device (e.g., a tablet or smartphone) having a touchscreen, processors and memory, and the capability to wirelessly link the mobile device to other remote devices or data networks. The mobile device may include a 3D imaging system for capturing images of the desired object and distance/depth information associated with the image. The system may include a time sensor and position sensor (e.g., GNSS receiver or inertial measurement unit (IMU) for timestamping and location-stamping the image and depth information. The system may determine, based on the captured images and depth information, the dimensions (e.g., height, weight, length), dimension weight, and volume of the desired object. The system may allow a user to modify the determined dimensions via the touchscreen. The system may detect and decode barcodes, text strings, or design elements from the images and thereby determine and display additional information about the object, such as its shipping history. The system may make additional determinations regarding the shipping or resource value of the object (e.g., its stackability, or via which vehicles it should be transported). The system may add any new data (e.g., new images, their times and locations, associated object dimensions, and shipping determinations) and add the new data to the object's shipping history, allowing the user to modify the new data via the touchscreen if necessary.

In a further aspect, embodiments of the inventive concepts disclosed herein are directed to a method for volume dimensioning via a mobile computing device such as a smartphone or tablet. The method may include activating a 3D imaging system of the mobile device. The method may include capturing, via the 3D imaging system, images of a selected object (e.g., a package, shipment, or item displayed for retail sale) and depth information associated with the images. The system may include determining, via sensors of the mobile device, time and location stamps of the images. The method may include determining, via processors of the mobile device, the dimensions of the object (including height, weight, length, dimension weight, and volume) based on the images and depth information. The method may include modifying the determined dimensions based on user input entered via the touchscreen of the mobile device. The method may include determining additional information about the desired object based on the captured images and determined dimensions. The method may include performing shipping determinations and value determinations about the object based on the captured images and determined dimensions. The method may include adding the captured images, determined dimensions, and new data associated with the object to a shipping history or data profile of the object.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 8A through 8D illustrate an exemplary embodiment of a method according to the inventive concepts disclosed herein.

DETAILED DESCRIPTION OF EXEMPLARY EMBODIMENTS

Figure 1:
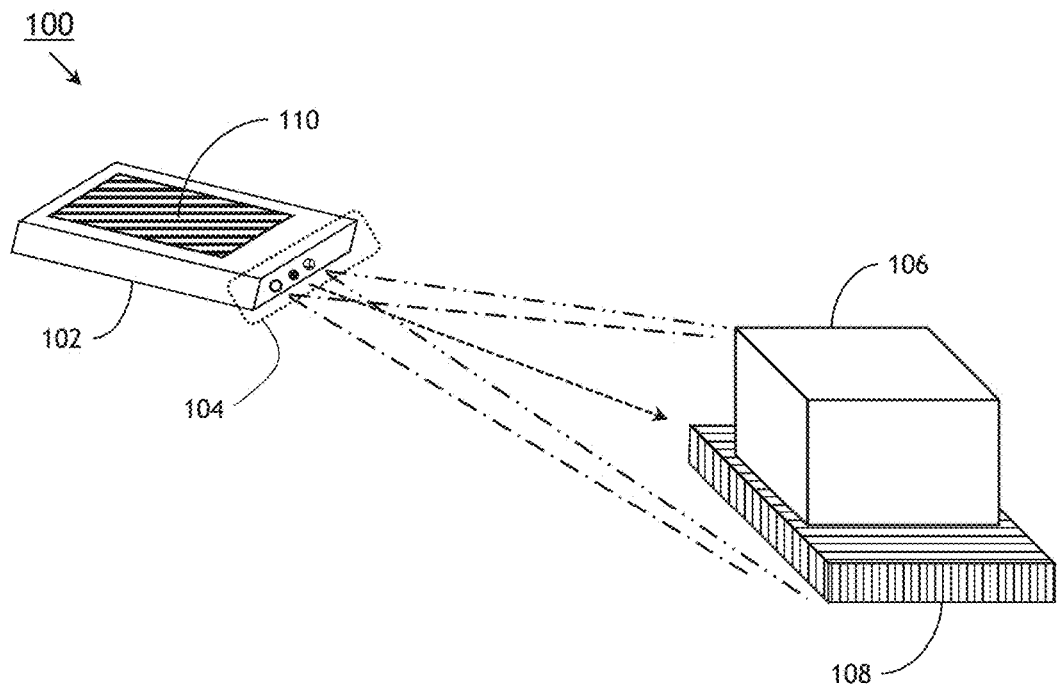
FIG. 1 is an illustration of an exemplary embodiment of a volume dimensioning system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for volume dimensioning of shipments, packages, and other objects entering or traversing a supply chain, or displayed for sale in a retail establishment. Embodiments of the inventive concepts disclosed herein may be implemented by a system or device as disclosed in related applications 15-1-3 and 15-1-4. The system uses a 3D imager to capture images of, and depth information about, a desired object, thereby assessing the dimensions of the object and determining, based on the object's dimensions and other critical information, how to allocate shipping resources to most efficiently and safely transport the object to its intended destination.

Figure 2:
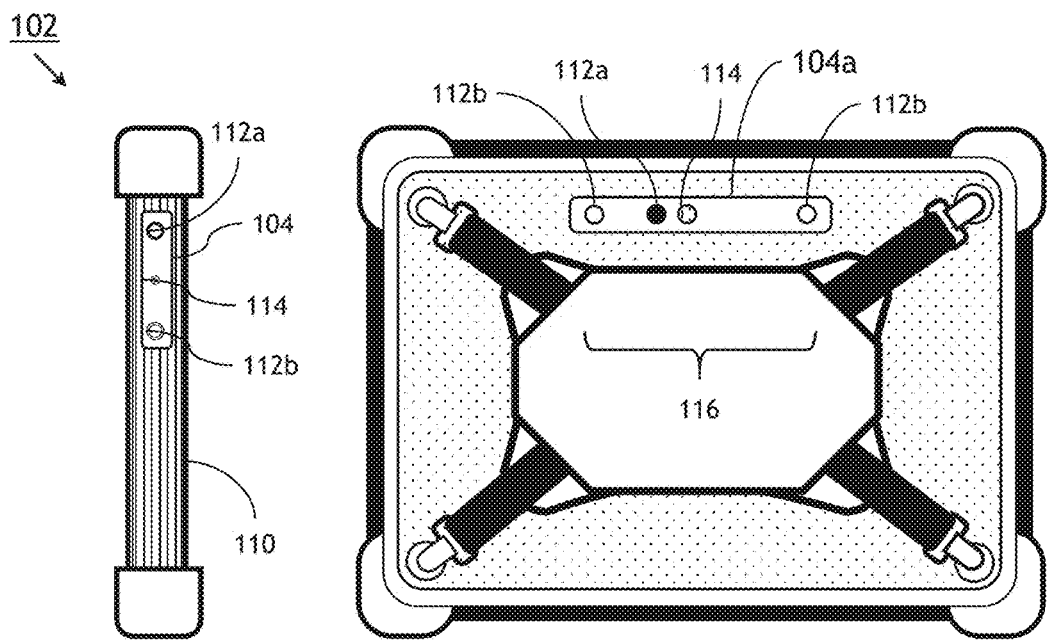
FIG. 2 is a side and rear facial view of a mobile computing device of the system of FIG. 1.

Referring to FIG. 1, an exemplary embodiment of a system 100 for volume dimensioning may include a mobile computing device 102 (e.g., a tablet or smartphone) equipped with a 3D imaging system 104 for capturing images of an object 106 (e.g., a shipment, package, or pallet 108 supporting multiple shipments or packages). Referring also to FIG. 2, a mobile device 102 of the system 100 may include a touchscreen 110 on its front face and a 3D imaging system 104 incorporating at least two cameras. For example, a standard two-dimensional camera 112a may detect electromagnetic (EM) radiation, and capture images, in the visible spectral band while an infrared (IR) camera 112b detects radiation and captures images in the IR spectral band (e.g., near-IR, short-wave IR, long-wave IR). The 3D imaging system 104 may include an illuminator 114 which emits IR radiation allowing the IR camera 112b to capture images of the object 106. The 3D imaging system 104 may be mounted in an external edge of the mobile device 102, or the 3D imaging system may be rear-mounted (104a), i.e., in a rear face of the mobile device opposite the touchscreen 110. The rear-mounted 3D imaging system 104a may include left and right IR cameras (depth-sensing cameras) 112b separated by a fixed distance 116; the system 100 may use this distance 116 to derive depth information from the images captured by the two IR cameras 112b from different points of view.

Figure 3:
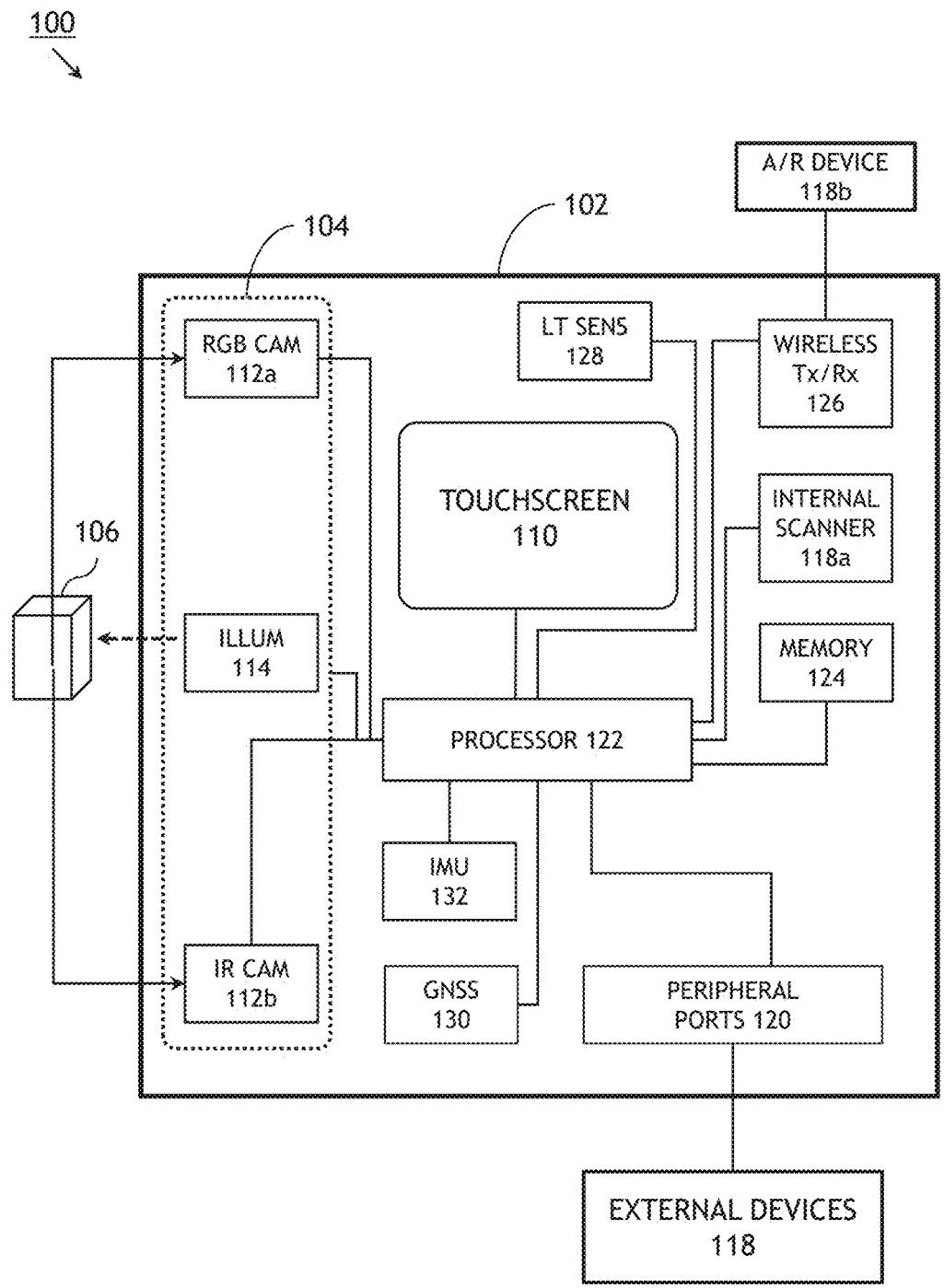
FIG. 3 is a block diagram illustrating components of the system of FIG. 1.

Referring to FIG. 3, the system of FIG. 1 may include a mobile device 102 and external peripheral devices 118 connected to the mobile device 102 by peripheral ports 120. The mobile device may include processors 122 and a memory 124 or similar means of data storage. The mobile device may include a wireless transceiver 126 for connecting the mobile device to external devices 118, or to other data networks or cloud-based systems, via a wireless link (e.g., Ethernet, Bluetooth). The external peripheral devices 118 may include scanners 118a (e.g., fingerprint scanners, barcode scanners, RFID scanners, card readers), which scanners may also be incorporated into the mobile device 102. The mobile device 102 may include an ambient light sensor 128, an absolute position sensor 130 (e.g., GNSS, GPS, GLONASS), an inertial position sensor 132 or inertial measurement unit (IMU) such as an accelerometer, gyrometer, compass, or magnetometer. The mobile device 102 may include a time sensor 134, which may be a processor clock or other timekeeping device incorporated into the mobile device 102. When the 3D imaging system 104 captures images of the object 106, the time sensor 134 and absolute position sensor 130 may document a precise time and location of the captured images, so the progress of the object 106 through a supply chain (or its precise location within the supply chain at any given time) can be easily tracked. The external peripheral devices 118 may also include an augmented reality device 118b, which may be a hand-held device or head-worn device (HWD) worn by a user. The system 100 may generate three-dimensional wireframe images of the object 106, or a holographic image of the object 106, for manipulation and display via the augmented reality device 118b.

Figure 4A:
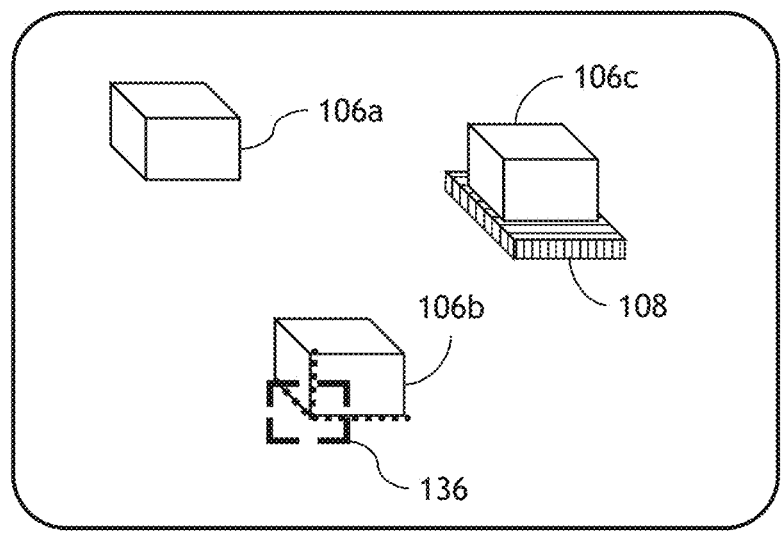
FIGS. 4A through 4F are display screen views illustrating volume dimensioning operations implemented by the system of FIG. 1.

Referring to FIG. 4A, the touchscreen 110 of the system 100 of FIG. 1 may display images of one or more candidate objects 106a-c captured in real time or near real time by the 3D imaging system 104 (FIG. 1). The user of the mobile device 102 (FIG. 1) may reduce the field of view of the 3D imaging system 104 (e.g., in order to conserve system resources or manually select a desired object 106b from the candidate objects 106a-c) via adjustable brackets 136 displayed on the touchscreen 110. For example, the user may activate the 3D imaging system 104 and invoke the adjustable brackets 136 by interaction with the touchscreen 110 (via contact with one or more fingers or, e.g., a stylus or similar peripheral device 118), centering the adjustable brackets 136 on a feature of the desired object 106b, such as a corner or an edge, likely to be detected by the 3D imaging system 104. The system 100 for volume dimensioning may then automatically be triggered by the detection of a feature, or the user may manually trigger the system.

Figure 4B:
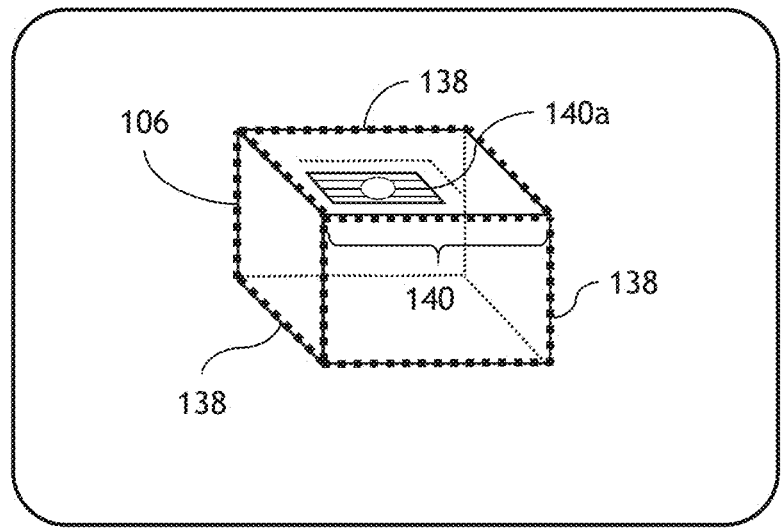

Referring to FIG. 4B, the touchscreen 110a of the system 100 may function similarly to the touchscreen 110 of FIG. 4A, except that the touchscreen 110a is focused on an object 106 selected by the user or detected by the system. The system 100 may analyze the captured images displayed by the touchscreen 110a to find the edges (138a-c) of the object 106 or determine a distance 140 by which the system 100 may derive depth information associated with the captured images. In the alternative, the processors 122 (FIG. 1) may assign a depth value Z to selected pixels (X, Y) of the captured images by overlaying, or otherwise comparing, the images captured by the cameras 112a, 112b (FIG. 2) of the mobile device 102. The system 100 may utilize image recognition or pattern recognition algorithms to detect an edge or corner, or analyze depth information to identify planes intersecting or terminating at right angles (implying an edge). The system 100 may identify a hidden corner, e.g., where two planes intersect at an edge with a third plane hidden but parallel to a base surface such as a table or floor upon which the object 106 rests. A similar plane may then be raised to the maximum height of the object to define a rectangular cuboid having length, width, and height (from which the volume and other dimensions may be derived). Actual dimensions may be defined relative to a particular distance from the object 106, or by referencing relative to the object 106 a marker object 140a having known dimensions, e.g., a dollar bill or a ruler.

Figure 4C:
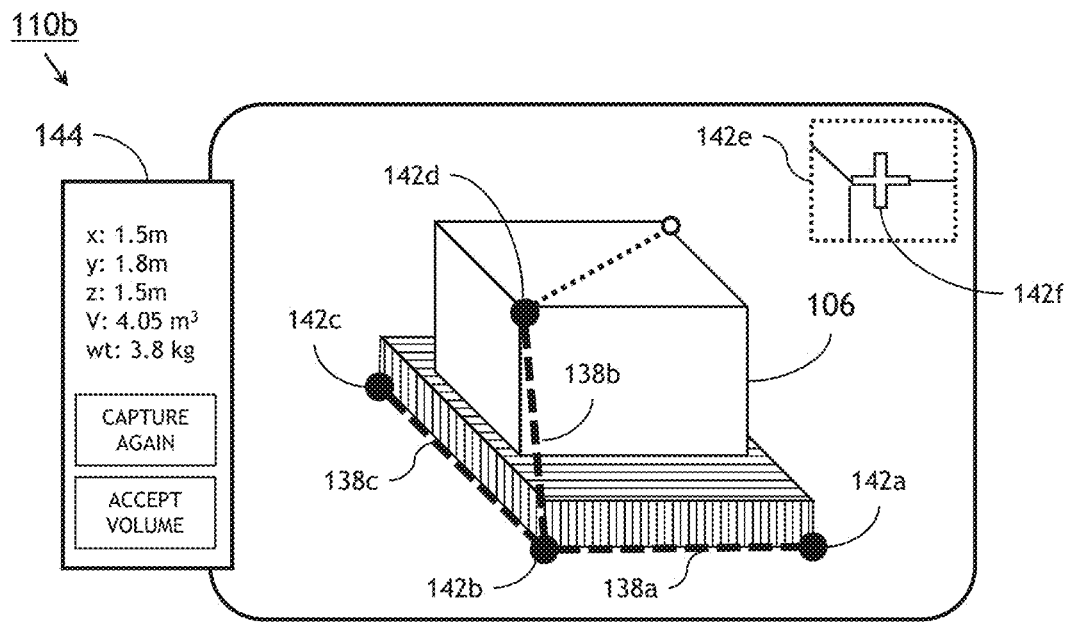

Referring to FIG. 4C, the touchscreen 110b of the system 100 may function similarly to the touchscreen 110a of FIG. 4B, except that the system 100 has defined the edges 138a-c and bounds 142a-d of the object 106, displaying in a window 144 of the touchscreen 110 the calculated dimensions, calculated volume, and estimated dimension weight (volumetric weight, "dim weight") of the object 106 based on the determined edges and bounds. For example, based on the estimated distance 140, or on knowledge available to the system 100 about standard container sizes, the system 100 may determine the object 106 to be 1.5 m long (edge 138c), 1.8 m wide (edge 138a), and 1.5 m tall (edge 138b), thereby having a volume of (1.5*1.8*1.5)=4.05 m³ and an estimated dimensional weight of 3.8 kg. Depending on current conditions, e.g., ambient light available to the 3D imaging system 104, the system 100 may or may not automatically eliminate from its calculations the pallet 108 on which the object 106 rests. The user may accept the calculations of the system 100 or manually make further adjustments. Execution of a request for calculating a volume or displacement (or the like) may be a multi-position trigger, a multi-position hard key or button, a multi-position soft button, a tap, a finger lift, a sequence of taps and lifts, or a gesture or the like. While the user is repositioning (via, e.g., a finger) a bound 142a-d, a pop-up zoom window 142e may be displayed, providing a zoomed-in view of the portion of the touchscreen 110b currently obscured by the user's finger. The zoom window 142e may include a crosshair 142f for precisely targeting where the repositioned bound 142a-d will be placed on the touchscreen 110b. If the system 100 has recognized a corner, the repositioning bound 142a-b may "snap" to the recognized corner if guided there by the user.

Figure 4D:
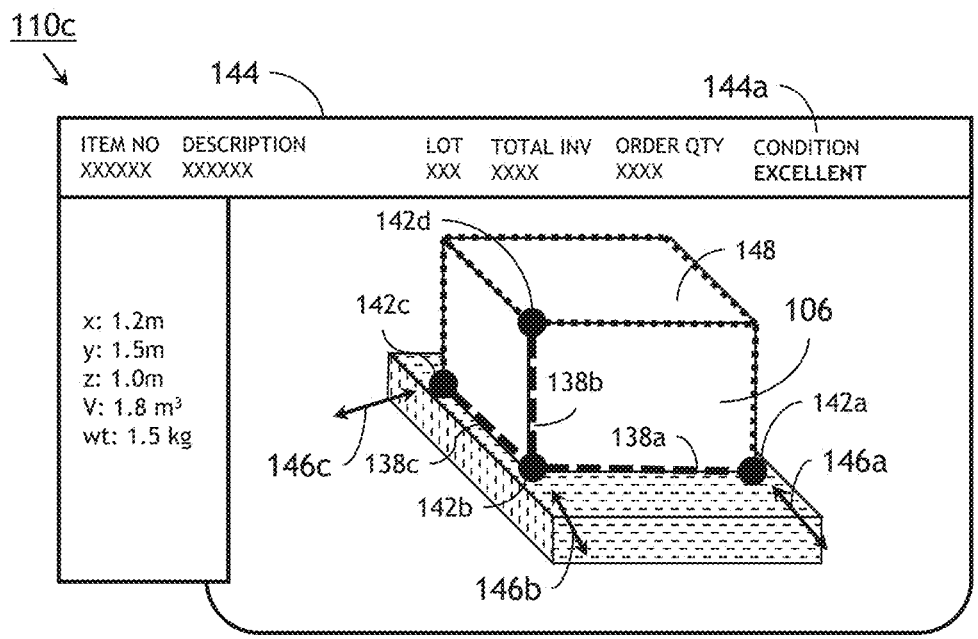

Referring to FIG. 4D, the touchscreen 110c of the system 100 may function similarly to the touchscreen 110b of FIG. 4C, except that the touchscreen 110c allows the user to manually adjust the edges 138a-c and bounds 142a-d of the object 106 (e.g., to eliminate the pallet 108 from the calculations of the system 100). For example, the user may drag the bounds 142a-c along the touchscreen 110c to new locations (146a-c). As the bounds 142a-c are repositioned by the user, the edges 138a-c of the object 106 (which link the bounds 142a-c to each other) will automatically recalibrate as will the corresponding calculated dimensions, calculated volume, and dimensional weight of the object 106 displayed in the window 144. In some embodiments, the system 100 may generate a three-dimensional wireframe image (148) of the object 106 and calculate its dimensions based on the generated 3D image.

Figure 4E:
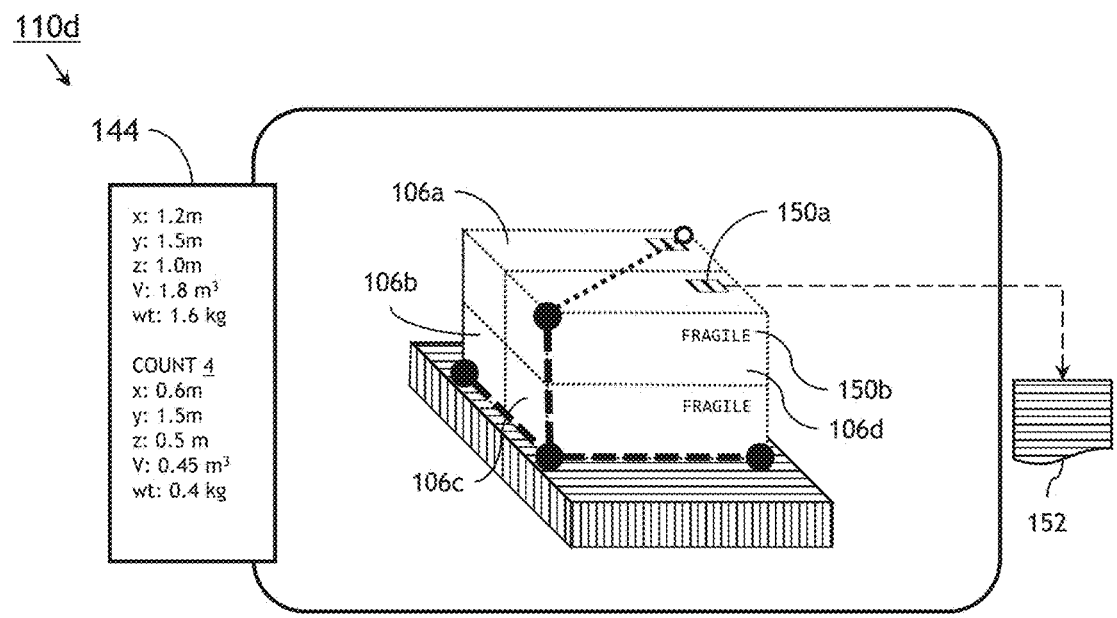

Referring to FIG. 4E, the touchscreen 110d of the system 100 may function similarly to the touchscreen 110c of FIG. 4D, except that the system 100 has determined that the object 106 includes four subobjects, or parcels, 106a-d. The system 100 may determine a count of the parcels 106a-d and display the count, along with corresponding dimensions for each of the four parcels 106a-d, in the window 144. As with the dimensions of the object 106, the user may correct or modify an erroneous or missing estimate of the parcel count via the touchscreen. The system 100 may identify, based on the captured images displayed on the touchscreen 110d, an object identifier, e.g., a barcode 150a, quick-read (QR) code, a text string 150b, or other markings on the exterior of the object or parcels 106a-d identifying a specific parcel. For example, the system 100 may detect a barcode 150a on the exterior of the parcel 106b and, by decoding (e.g., scanning) the barcode, access a shipping history 152 or similar data profile associated with the parcel 106b. The shipping history may include, e.g., the origin and destination points of the parcel 106b; the contents of the parcel 106b (including, e.g., brand descriptions and package sizes); the shipping history of the parcel 106b, including specific shipping, storage, or handling directions (e.g., with respect to the temperature, light, or pressure conditions under which the parcel 106b should be shipped and stored or whether the parcel 106b is stackable); the dimensions of the parcel 106b (against which the dimensions calculated by the system 100 may be verified); and previously generated images of the parcel 106b (to which the currently captured images may be compared to assess any potential damage to the parcel). The currently captured images, along with other concurrently collected metadata (e.g., the calculated dimensions and volume, estimated dim weight, the time and location of the images, and any additional shipping directions or notes entered by the user) may be added to the shipping history 152.

Figure 4F:
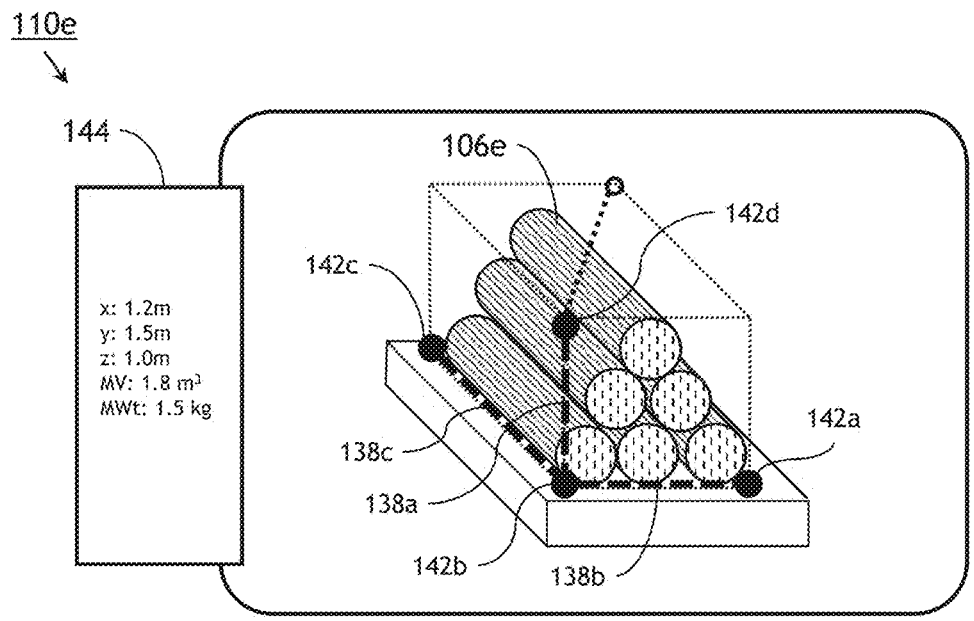

Referring to FIG. 4F, the touchscreen 110e of the system 100 may function similarly to the touchscreen 110d of FIG. 4E, except that the touchscreen 110e indicates currently captured images of a non-cubical or nonstandard object 106e (e.g., an object of nonstandard shape). The system 100 may estimate a cube volume based on the estimated dimensions of the nonstandard object 106e, which may be adjusted by the user (edges 138a-c and bounds 142a-d) to create a virtual cube or rectangular prism entirely enclosing the nonstandard object 106e and this reflecting a maximum volume (and a maximum dimensional weight) of the nonstandard object 106e, displaying the system calculations and estimates in the window 144.

Figure 5A:
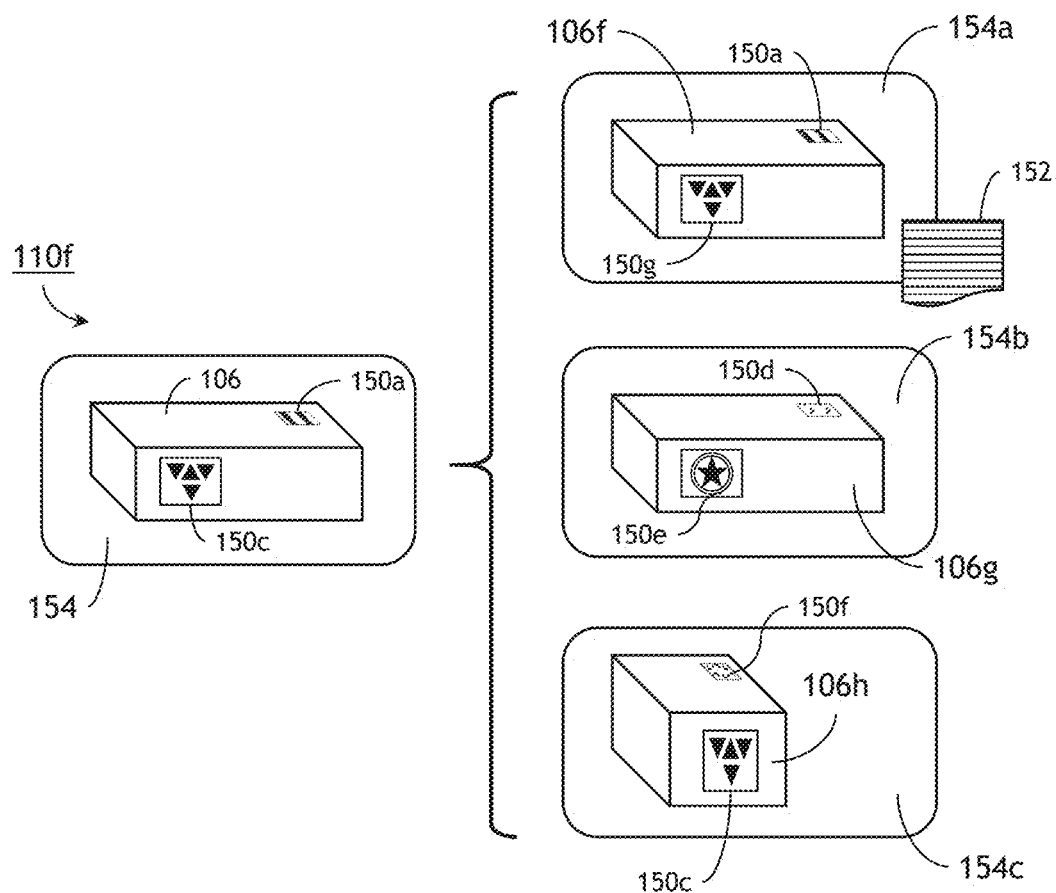
FIGS. 5A and 5B are diagrammatic illustrations of image referencing operations implemented by the system of FIG. 1.

Referring to FIG. 5A, the system 100 of FIG. 1 may compare captured images 154 of an object 106 (and displayed on the touchscreen 110f) to reference images 154a-c to access a shipping history 152 of the object 106. The reference images 154a-c may be stored in the memory 124 of the mobile device 102 (FIG. 3) or accessed remotely (e.g., from a remote device or data network) via a wireless link established by the wireless transceiver 126. The system 100 may use the recently calculated dimensions of the object 106, or any detected object identifiers such as a barcode 150a or package label 150c, to match the object 106 portrayed in the current image 154 to objects 106f-h portrayed in the reference images 154a-c. For example, the object 106g of reference image 154b may be dismissed by the system 100, as neither its barcode (150d) nor its package label (150e) match the barcode 150a or package label 150c of the object 106. Similarly, the system 100 may dismiss the object 106h of reference image 154c; while its package label 150c is a match for the object 106, the barcode 150f is not a match for the barcode 150a and the dimensions of the object 106h do not match those of the object 106. The system 100 may conclude, however, that the object 106f of the reference image 154a is a close match for the object 106 (e.g., that the reference image 154a portrays an object 106f identical to the object 106 based on a matching package label 150g, or that the reference image 154a portrays the object 106 itself at an earlier point in time, based on its matching barcode 150a), and access the shipping history 152 associated with the object 106f to identify further characteristics of the object 106 (e.g., package sizes or brand identifiers).

Figure 5B:
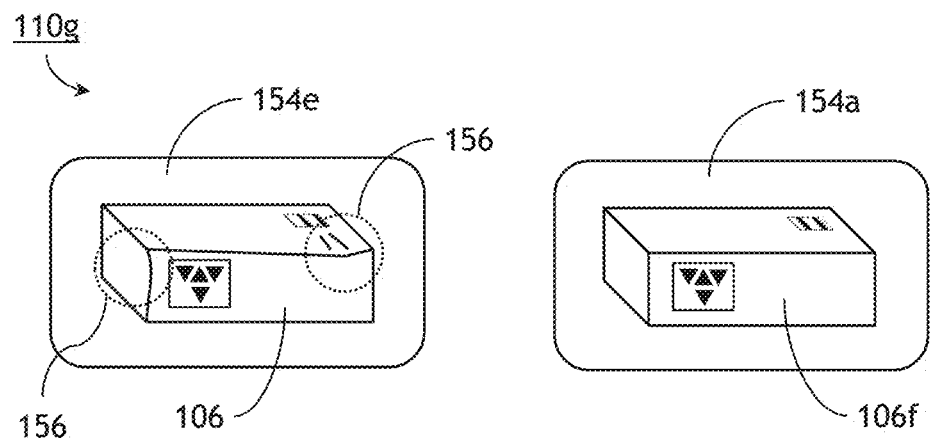

Referring to FIG. 5B, the touchscreen 110g may function similarly to the touchscreen 110f of FIG. 5A, except that the current image 154e displayed by the touchscreen 110 of the system 100 may be compared to a reference image 154a to assess damage to the object 106 of the current image 154e. For example, the reference image 154a may portray an object 106f that is either identical to the object 106 in significant ways (e.g., dimensions, contents, brand identifiers) or that portrays the exact object 106 at an earlier point in time. By comparing the current image 154 and reference image 154a, the system 100 may identify areas of potential damage (156) to the object 106. If the areas of potential damage 156 were not previously identified, the system 100 may note in the shipping history (152, FIG. 4A) the time and location of the current image 154 as a likely point where the damage to the object 106 may have occurred. For example, if the object 106 is a rental vehicle, a new image set of the vehicle may be generated before the vehicle is released to a renter, and a second image set generated upon return of the vehicle. By comparing the two image sets, any new damage to the vehicle may be noted and logged in the vehicle history and accounted for by the renter, who in turn will not be held responsible for any damage to the vehicle predating the rental period.

Figure 5C:
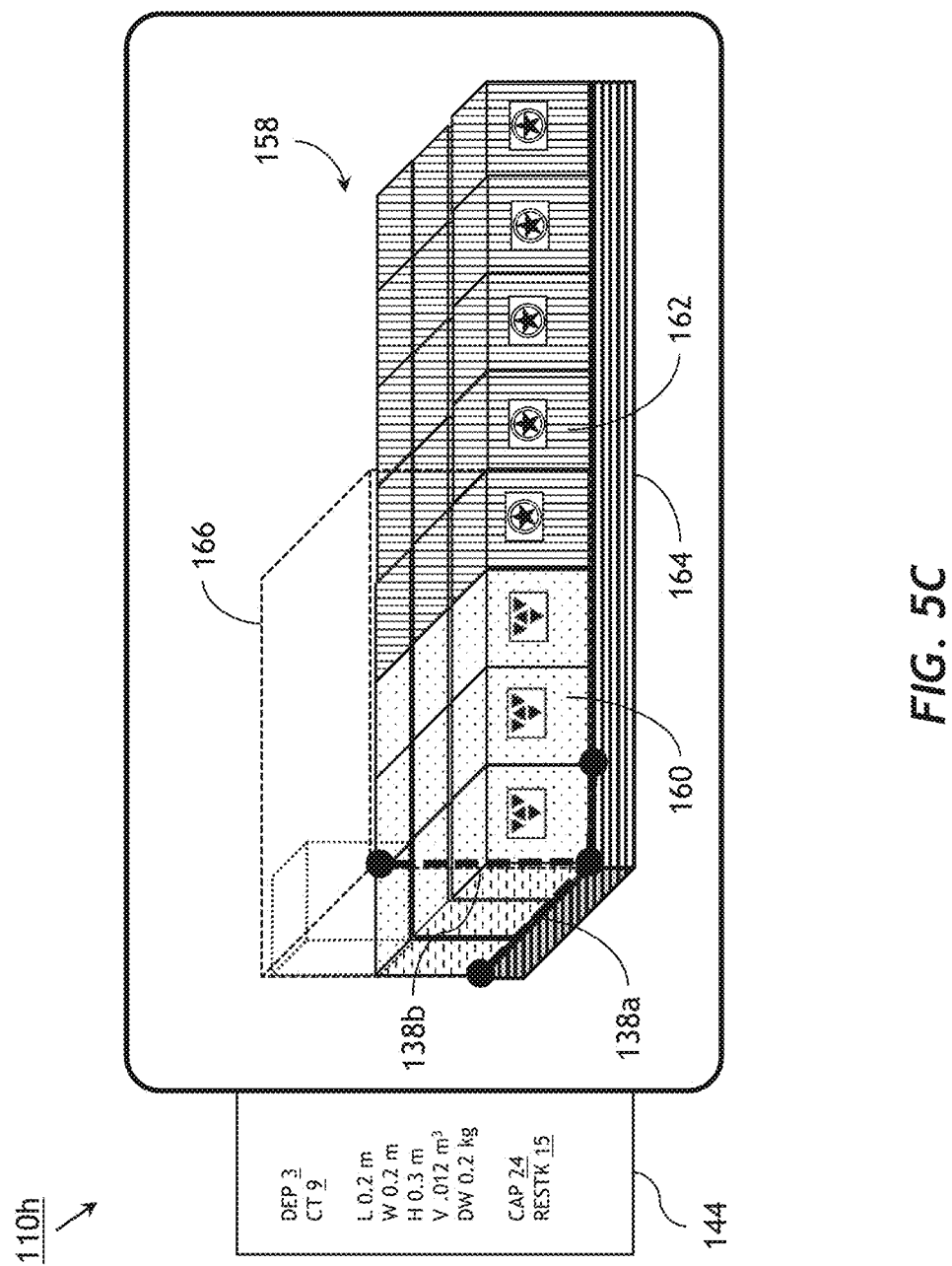
FIG. 5C is a display screen view illustrating image referencing operations implemented by the system of FIG. 1.

Referring to FIG. 5C, the touchscreen 110h may function similarly to the touchscreen 110a of FIG. 4B, except that the touchscreen 110h reflects captured images of a product display 158 (e.g., shelf set) in a store or other retail establishment. For example, a stocking agent may visit the store to assess the condition of his/her own products 160 (and a competitor's products 162) displayed on a shelf 164. The system 100 may determine, based on captured images, that the stocking agent's own products 160 are stacked three across and the competitor's products 162 are stacked five across. The system 100 may estimate the volume of the shelf 162 (by estimating the depth 138a and height 138b of the shelf 162) and conclude that the shelf 162 includes nine units of the stocking agent's own product 160 and 15 units of the competitor's product 162, based on a shelf depth equivalent to three units of the stocking agent's own package 160, displaying (in the window 144) counts and dimension estimates for each unit of the stocking agent's own product 160. The stocking agent may correct an erroneous estimation of the shelf depth via the touchscreen 110. The system 100 may also be programmed with information about the proper allocations of shelf space, noting, for example, that 1) the stocking agent's own product 160 should be allocated sufficient space on the shelf 162 to accommodate 24 units (as opposed to the 18 currently allocated) and 2) a restocking of fifteen units will be necessary to fill the allocated shelf space.

Figure 6:
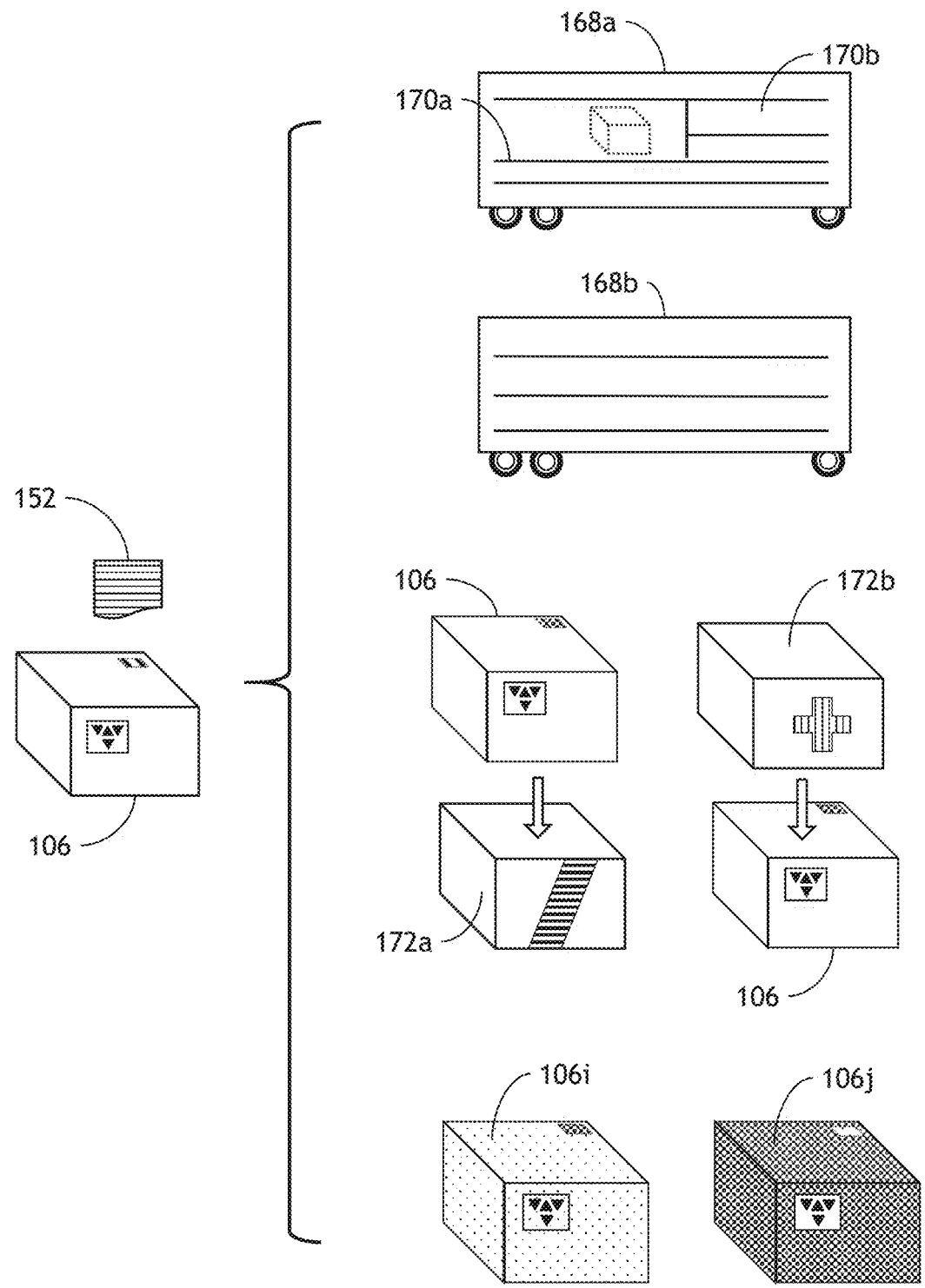
FIG. 6 is a diagrammatic illustration of shipping and value determination operations implemented by the system of FIG. 1.

Referring to FIG. 6, the system 100 may perform one or more resource determinations with respect to the shipping or storage of an object 106, based on currently captured images, dimensional information derived from the captured images, or other information in the shipping history 152 of the object 106. For example, the object 106, en route between two cross-docking points, may be assigned to a first truck 168a or other shipping vehicle (and not to a second truck 168b) based on the dimensions of the object 106; the second truck 168b may not currently have sufficient shelf space to accommodate the object 106. The system 100 may have access, through a wireless link established by the wireless transceiver 126 of the mobile device 102, to databases including detailed information as to the vehicles, cross-docking points, warehouses, storage facilities, and other components of the supply chain in which the object 106 travels and the current contents of each component (as well as the individual rooms, compartments, or shelves of each individual component and the contents and dimensions of each). Within the first truck 168a, the system 100 may assign the object 106 to a shelf 170a having sufficient vertical clearance to accommodate the volume of the object 106 (as opposed to the shelf 170b, on which the system 100 may determine that the object 106 will not fit). The system 100 may determine, based on the shape, volume, or fragility of the object 106 (as indicated by the shipping history 152), whether the object 106 may be safely stacked atop another object (172a), or whether a third object (172b) may be stacked atop the object 106, without damaging either the object 106, or the additional objects 172a, 172b. Furthermore, the system 100 may perform a value assessment of the object 106 by comparing its estimated volume and dimension weight. For example, a low-value object 106i may include loosely packed or light contents; the dimensional weight may be extremely low compared to the average dimensional weight for a given volume, and thus the low value of the object 106i may be associated with excessive volume taken up for an object of a particular dimension weight. Conversely, a high-value object 106j may be densely packed, such that the dimension weight of the object 106j exceeds the average for the volume of the object, and a given truck 168a may be able to transport more of the high-value object 106j than the low-value object 106i. The system 100 may perform further shipping assessments of the objects 106i, 106j based on the value assessment, prioritizing the assignment of the objects 106i, 106j according to the determined value.

Figure 7A:
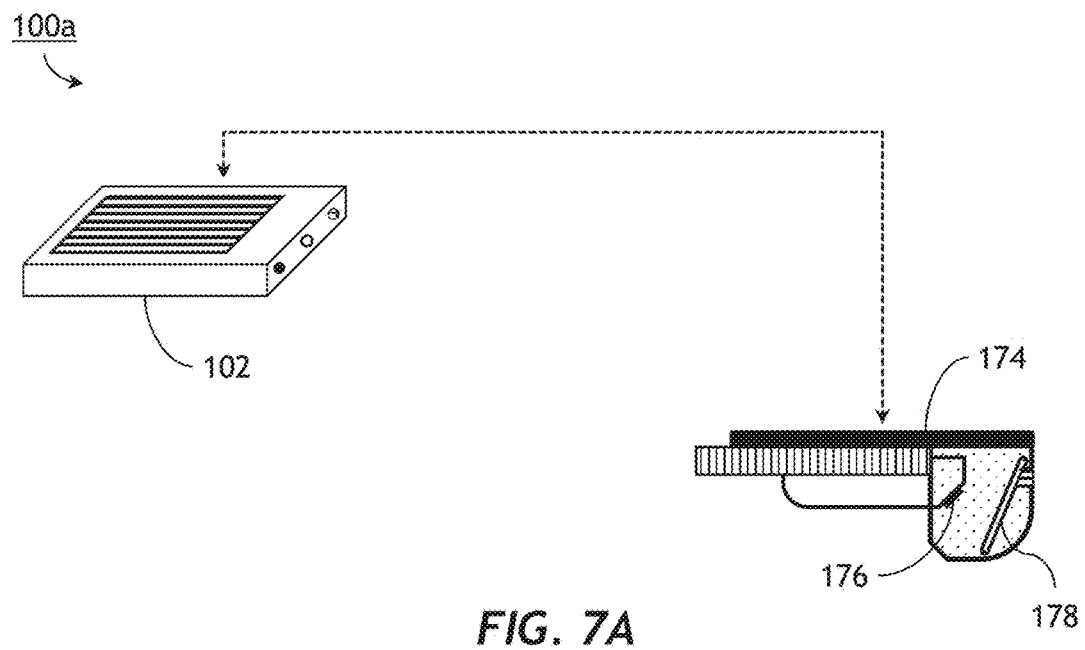
FIG. 7A is an illustration of an exemplary embodiment of a system for augmented reality volume dimensioning according to the inventive concepts disclosed herein.

Referring to FIG. 7A, a system 100a for volume dimensioning may operate similarly to the system 100 of FIG. 1, except that the mobile device 102 of the system 100a may be wirelessly linked to an augmented reality device 174. The augmented reality device 174 may be a standard handheld device or a head-worn device (HWD) worn by a user, such as a pair of goggles wherein projectors 176 project an infinitely focused 3D or holographic image onto a screen 178 proximate to the user's eyes (or, in some embodiments, directly onto the user's retina).

Figure 7B:
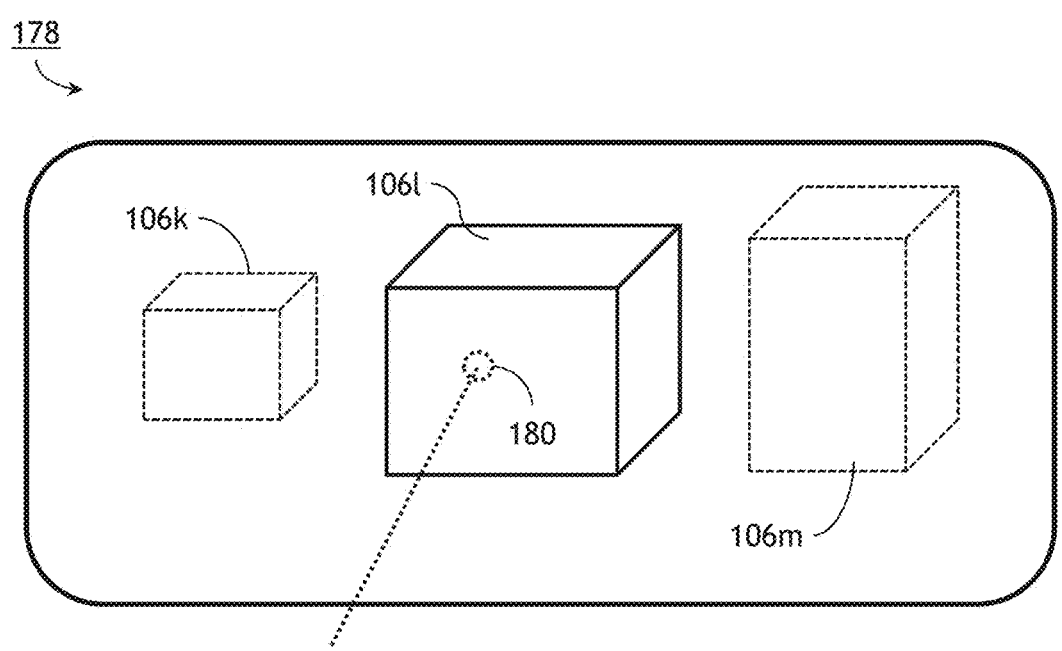
FIGS. 7B through 7D are augmented reality device views illustrating volume dimensioning operations implemented by the system of FIG. 7A.

Referring to FIG. 7B, the screen 178 of the augmented reality device 174 of FIG. 1 may allow the user to select a desired object from several candidate objects (106k-m) displayed in a holographic image by focusing the eyes (180) on the desired object 106l. The augmented reality device 174 may detect the movement of the user's eye and accordingly select the object 106l for volume dimensioning.

Figure 7C:
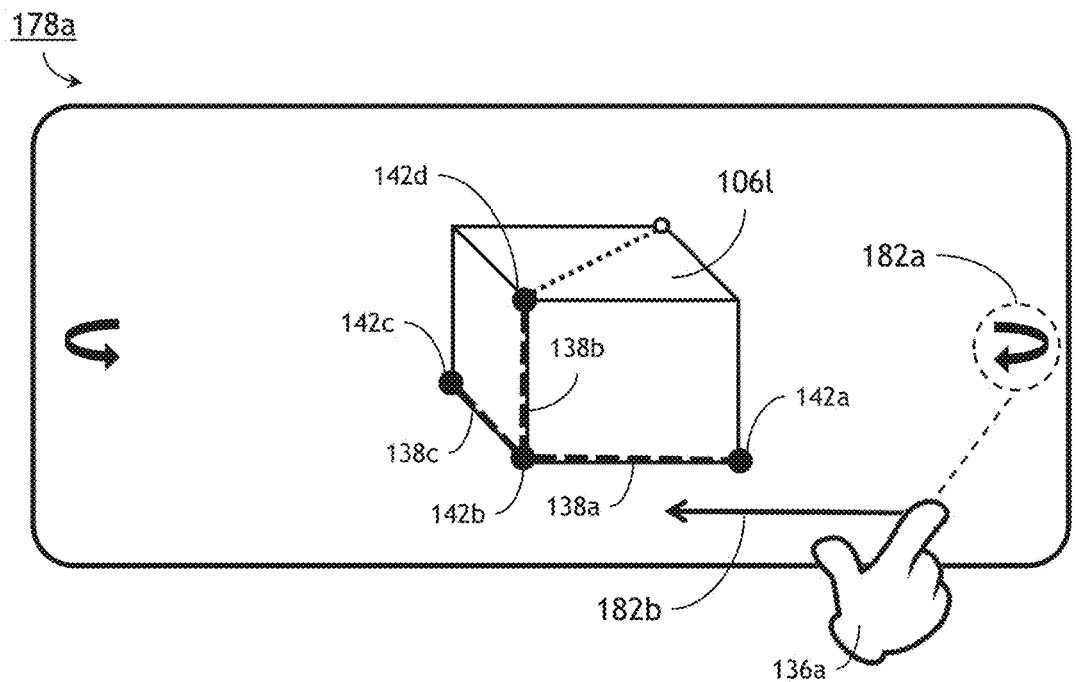

Referring to FIG. 7C, the screen 178a may function similarly to the screen 178 of the a 150h augmented reality device 174 of FIG. 7B, except that the screen 178a includes edges 138a-c and bounds 142a-d corresponding to the dimensions of the selected object 106l portrayed by the holographic image generated by the system 100 and displayed by the augmented reality device 174. The augmented reality device 174 may detect hand movements or gestures of the user within its field of view, such as tapping on a dedicated portion of the screen 182a or dragging one or more fingers (136a) or a stylus across the screen 182b (from the user's point of view) to rotate the holographic image of the object 106l in a given direction around a particular rotational axis (e.g., swipe left or right to rotate around the z-axis of the object 106l, or swipe up/down to rotate around the x-axis).

Figure 7D:
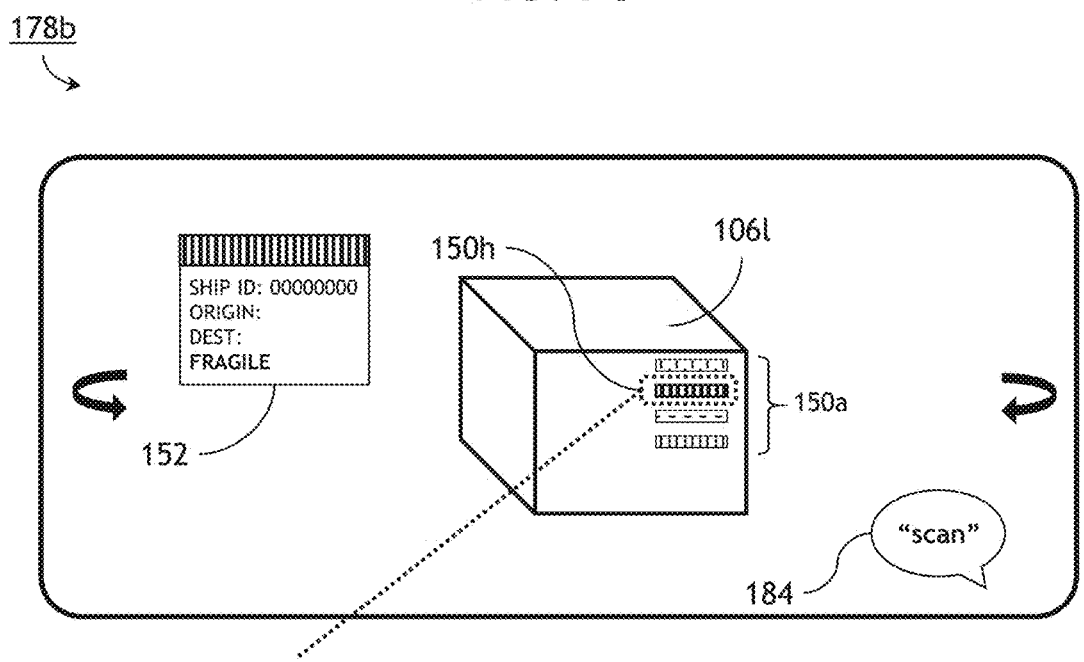

Referring to FIG. 7D, the screen 178b may function similarly to the screen 178a of the augmented reality device 174 of FIG. 7B, except that the screen 178b may display a view of the object 106l including several barcodes 150a. For example, the user may focus on a particular barcode 150h and vocally instruct the augmented reality device 174 to "scan" (184) the desired barcode. The augmented reality device 174 may display on the screen 178b the shipping history 152 or any metadata associated with the scanned barcode 150h.

Figure 8A:
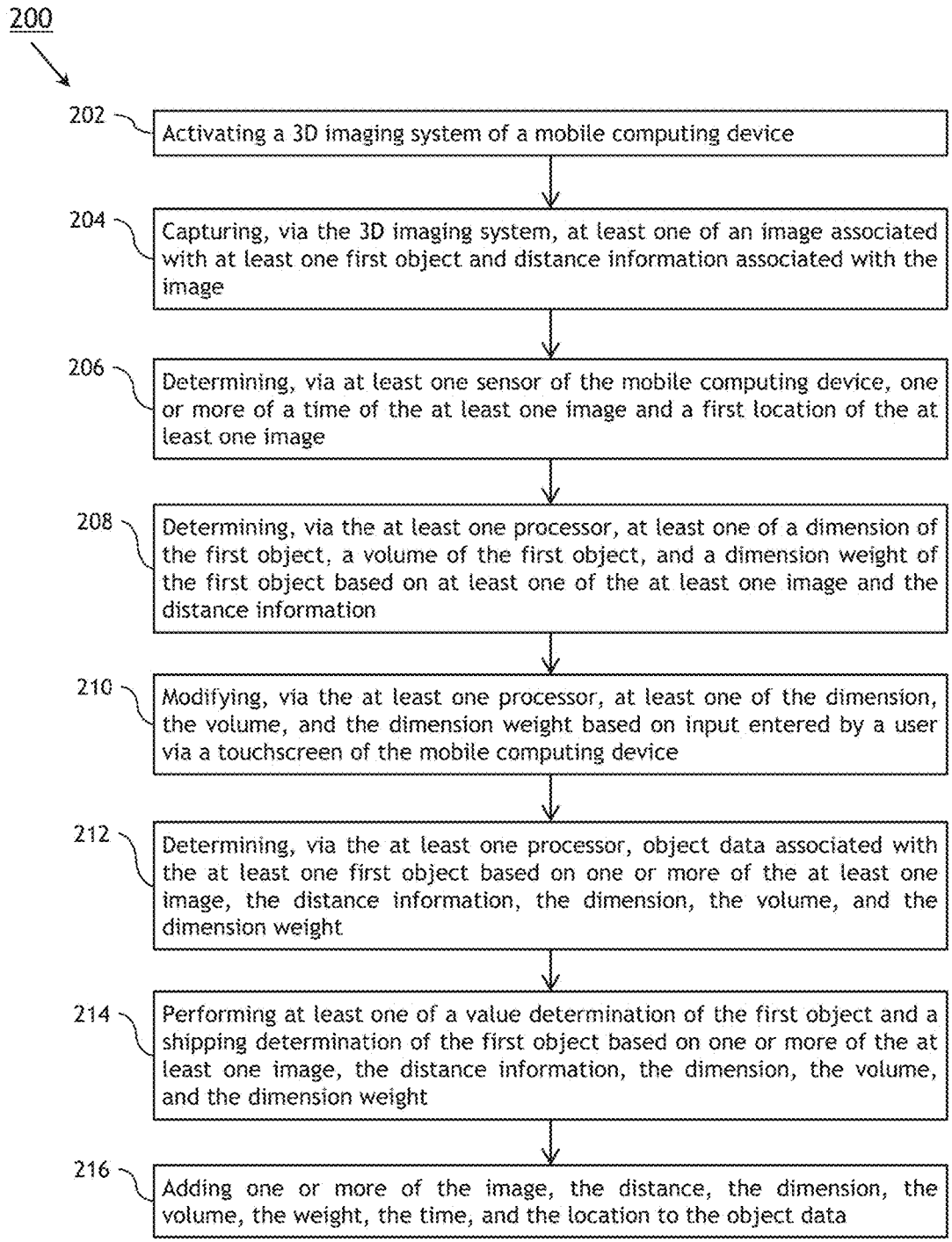

Referring to FIG. 8A, a method 200 for volume dimensioning may be implemented by the mobile device 102 of the system 100 and may include the following steps. At a step 202, the user may activate a 3D imaging system of the mobile device.

At a step 204, the 3D imaging system may capture images associated with a desired object and derive distance or depth information associated with the captured images. For example, the user may define or restrict a field of view of the 3D imaging system by positioning brackets on the touchscreen of the mobile device.

At a step 206, sensors of the mobile device may generate a timestamp and location stamp of the captured images.

At a step 208, the processors of the mobile device may determine a dimension (height, length, width) of the desired object, calculate a volume of the object, and estimate a dimension weight of the object.

At a step 210, the user may modify or correct the determined dimension, volume, or dimension weight via the touchscreen of the mobile device. For example, the user may modify a dimension, volume, or dimension weight by positioning edges and bounds displayed on the touchscreen and corresponding to the bounds and edges of the desired object. The user may select a desired object from a group of candidate objects by positioning icons or brackets displayed on the touchscreen.

At a step 212, the processors may determine object data, such as a shipping history, of the desired object based on the captured images, the distance information, the determined dimensions, the calculated volume, and the estimated dimension weight. For example, the system may detect a barcode, QR code, RFID code, text string, brand identifier, design element, or other object identifier from the captured images and determine object data by decoding the detected object identifier. The system may determine object data by comparing the captured images to reference images of a database stored remotely or in the memory of the mobile device. Determined object data may include a count of the object, a brand or product description of the object, a damage status of the object, a shipping history of the object, or a shipping instruction of the object. The object data may be displayed, and modified by the user, via the touchscreen of the mobile device. The object identifier may be detected by an augmented reality device connected to the mobile device, and the object data determined by decoding the object identifier.

At a step 214, the processors may perform a shipping assessment or a value assessment based on the captured images, the distance information, the determined dimensions, the calculated volume, and the estimated dimension weight. For example, the object may be assigned to a particular vehicle or warehouse based on the captured image, the distance information, the determined dimensions and volume, and the estimated dimension weight. Similarly, the object may be assigned to a shelf, compartment, room, or other location within a vehicle or warehouse based on the captured image, the distance information, the determined dimensions and volume, and the estimated dimension weight. The system may determine whether the desired object may be safely stacked atop other objects, or whether other objects may be stacked atop the desired object. The system may perform a value assessment by comparing the determined volume to the estimated dimension weight, and perform subsequent shipping assessment based on the value assessment.

At a step 216, the system may add the captured images, the timestamp and location stamp, the distance information, the determined dimensions, the calculated volume, the estimated dimension weight, the determined shipping assessment, and the determined value assessment to the accumulated object data.

Referring to FIG. 8B, the method 200 may include an additional step 218. At the step 218, the system 100 may generate a restocking alert, a restocking order, or an inventory report based on the object data.

Referring to FIG. 8C, the method 200 may include an additional step 220. At the step 220, the system 100 may generate a 3D model or a holographic image of the desired object based on the captured images and distance information.

Referring to FIG. 8D, the method 200 may include additional steps 222, 224, and 226. At the step 222, the system 100 may display the generated holographic image via an augmented reality device wirelessly linked to the mobile device of the system.

At the step 224, the augmented reality device may detect an eye movement, a gesture or hand movement, or an audio command of the user.

At the step 226, the augmented reality device may adjust the displayed holographic image based on the detected eye movement, gesture, or audio command.

Referring to FIGS. 9A-9D, a system 300 for determining compliance with airline baggage size requirements is shown.

The system 300 may determine implemented to determine if a specific piece of baggage would meet the size requirements for a given flight or aircraft. Once a specific airline flight was identified the baggage requirements for the aircraft assigned to the flight plan can be used to compare the actual dimensions of baggage found through the dimensioning method to determine compliance of the baggage to flight requirements. This will provide travelers the ability to determine if their luggage will meet the baggage size requirements for their specific flight before arriving at the airport.

Figure 9A:
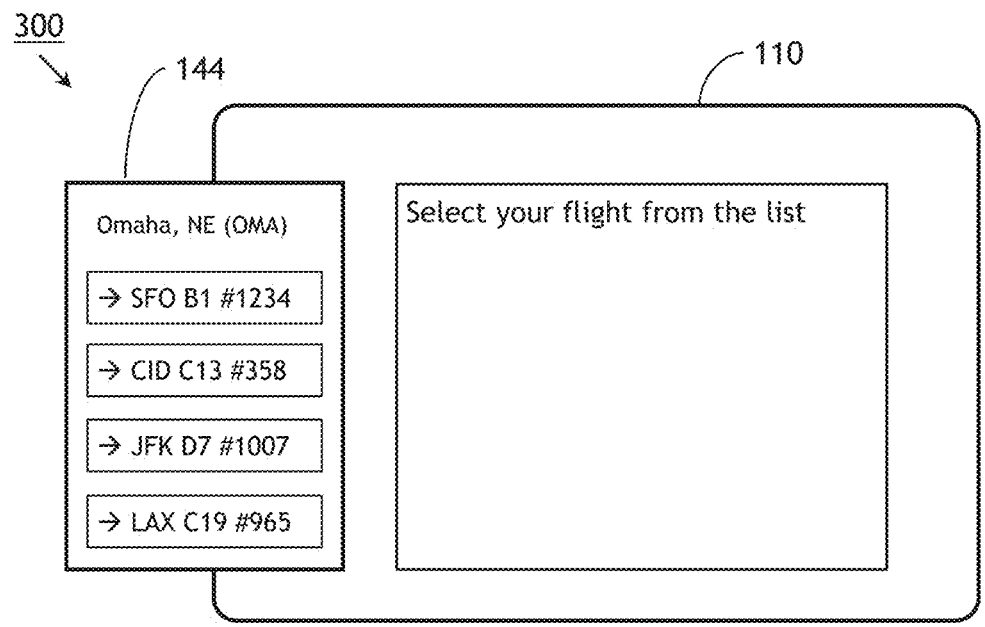
FIGS. 9A through 9D are display screen views illustrating operations of an exemplary embodiment of a system according to the inventive concepts disclosed herein.

A user may implement the system 300 at the airport or before leaving for the airport to quickly determine if his/her carry-on luggage complies with airline baggage size requirements. The system 300 may be used to pre-check for carry-on a compliant bag at home (within a predetermined time window of the scheduled departure), pay any fees associated with checking a noncompliant bag, and provide reference information for airport personnel handling the bag once the user arrives at the airport. Referring specifically to FIG. 9A, the system 300 may begin by determining the user's current location (e.g., via GPS) and displaying within the window 144 flight data for the nearest airport (or an airport selected by the user), from which the user selects a flight and gate.

Figure 9B:
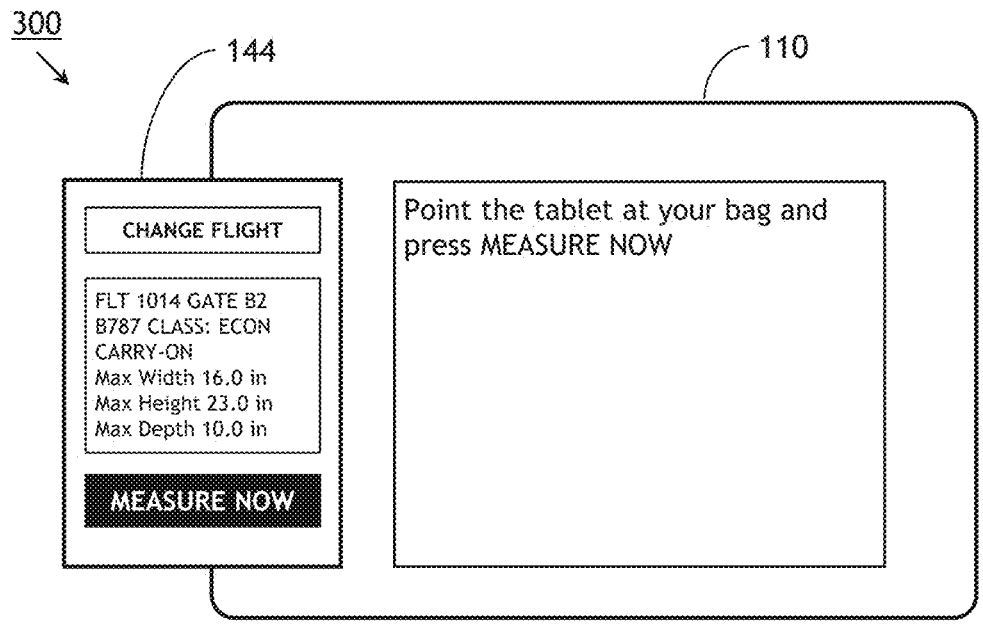

Referring to FIG. 9B, once a flight has been selected, the system 300 may display within the window 144 baggage dimensions associated with the selected flight (or with a relevant aircraft, based on the user's assigned seat, section, or class). The system may then invite the user to capture images of the relevant baggage via the onboard camera 112a (FIG. 3).

Figure 9C:
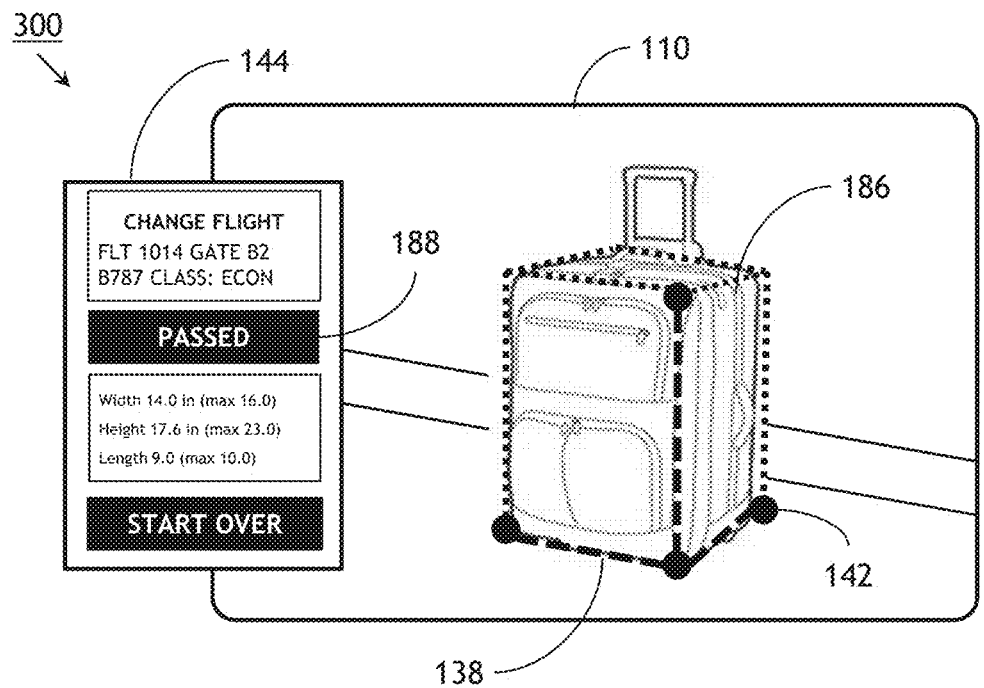

Referring to FIG. 9C, the system 300 may calculate the dimensions of the user's bag 186 by defining edges 138 and bounds 142 (which the user may reposition), and thereby determining if the calculated volume based on the determined dimensions passes (188) or fails the baggage size requirements for that flight or aircraft.

Figure 9D:
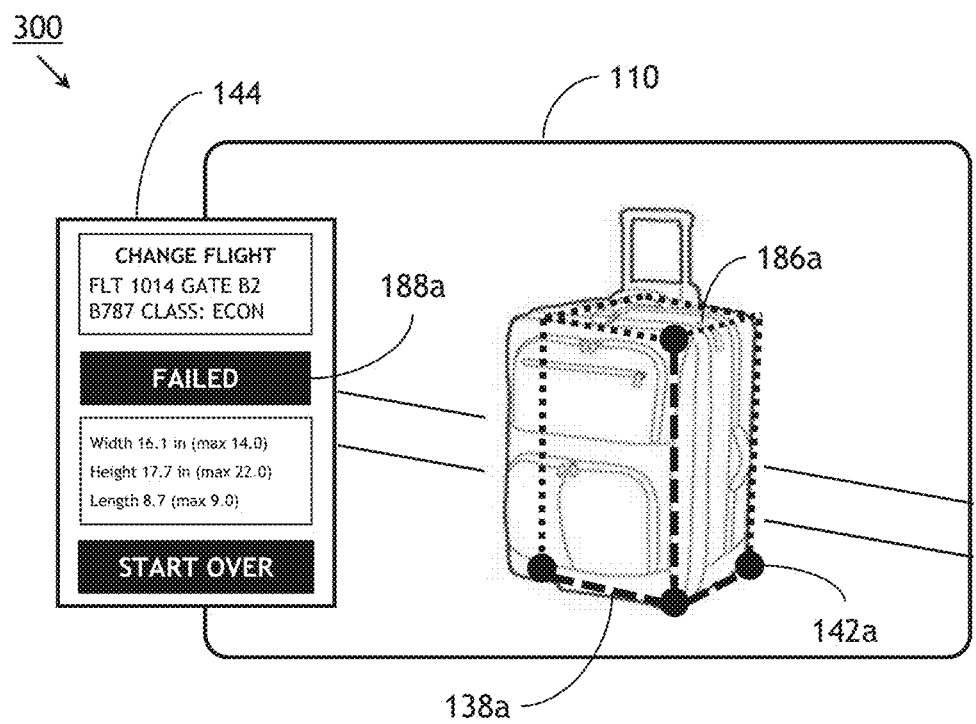

Referring also to FIG. 9D, if the user's bag 186a fails (188a) the baggage size requirements for a particular flight or aircraft, the system 300 may display edges (138a) and bounds (142a) consistent with a compliant bag.

The system 300 may additionally be implemented by a kiosk or similar airport check-in facility including a 3D imaging system proximate to a scale for weighing incoming baggage. The scale may further include a marker object 140a (FIG. 4B) optimally placed at an ideal angle for referencing accurate dimensions relative to a broad variety of bags placed on the scale. The scale may be physically or wirelessly linked to a mobile device 102 on which the system 300 is implemented. The system 300 may be user-triggered or trigger automatically when a bag is placed on the scale, determining the dimensions of the bag and verifying the bag's compliance with the carry-on baggage requirements associated with the appropriate flight or aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for volume dimensioning of products in a supply chain, the system comprising:
   a mobile computing device configured with a touchscreen, at least one processor, a memory, and a wireless transceiver configured to establish a wireless link;
   at least one three-dimensional (3D) imaging system of the mobile computing device, the at least one 3D imaging system configured to:
   a) capture at least one of (1) an image featuring one or more objects including a target object and (2) distance information associated with the image, the distance information including at least one distance between the mobile computing device and one or more of the target object and a marker object; and
   b) transmit the at least one image and the distance information to the at least one processor;
   a time sensor of the mobile computing device, the time sensor configured to determine a time of the at least one image;
   at least one position sensor of the mobile computing device, the position sensor configured to determine a location of the at least one image;
   the at least one processor configured to
   a) activate the at least one 3D imaging system;
   b) determine at least one dimension of the target object, the dimension including at least one of a width, a length, a height, a volume based on one or more of the image, the distance information, and a known dimension corresponding to the marker object;
   c) detect at least one object identifier corresponding to the target object based on the at least one image, the object identifier including at least one of a barcode, a QR code, an RFID code, a text string, a brand identifier, and a design element;
   d) associate object data with the target object based on one or more of the image, the determined dimension, the time, the location, reference data, and the at least one object identifier, the associated object data including at least one of a count, a fragility status, a prior status, a shipping origin, a shipping destination, a damage status, a shipping history, and a brand;
   e) display, via the touchscreen, one or more of the image, the determined dimension, and the determined object data; and
   f) generate, based on the associated object data, one or more object instructions corresponding to the target object, the object instructions including one or more of a shipping assignment, a storage assignment, a restocking order, an inventory report, and an update to the object data.

2. The system of claim 1, wherein the at least one first target object comprises at least one subject, the count includes a count of the at least one subobject, and the dimension includes at least one subdimension corresponding to the at least one subobject.

3. The system of claim 1, wherein the at least one processor is configured to:
  display, via the touchscreen, the at least one image including at least one icon superimposed on the at least one image and corresponding to the at least one dimension; and
  select the target object from the one or more featured objects based on user input entered via the touchscreen.

4. The system of claim 1, wherein the at least one processor is configured to generate, based on one or more of the at least one image and the distance information, at least one of a 3D model of the first object and a holographic image of the first object.

5. The system of claim 4, further comprising:
  at least one augmented reality device wirelessly linked to the mobile computing device, the at least one augmented reality device including a head worn device (HWD) worn by the user and configured to
    display the at least one holographic image to the user;
    detect at least one of an eye movement of the user, a gesture of the user, and an audio command;
    adjust the at least one holographic image based on at least one of the eye movement, the gesture, and the audio command;
    detect the at least one object identifier based on the at least one of the eye movement, the gesture, and the audio command; and
    display the object data associated with the at least one object identifier to the user.

6. The system of claim 1, wherein the reference data is at least one of a) stored in the memory or b) located remotely from, and wirelessly linked to, the mobile computing device.

7. The system of claim 1, wherein the shipping assignment and the storage assignment include at least one of:
  assigning the target object to at least one of a shipping vehicle and a storage location;
  assigning the target to at least one of a subdivision of the shipping vehicle and a subdivision of the storage location, the subdivision including at least one of a shelf, a room, and a compartment;
  determining whether the target object may be stacked atop at least one neighbor object; and
  determining whether the at least one neighbor object may be stacked atop the target object.

8. A method for volume dimensioning via three-dimensional (3D) imaging, comprising:
  activating a 3D imaging system of a mobile computing device;
  capturing, via the 3D imaging system, at least one of an image associated with at least one target object and distance information associated with the image, the distance information including at least one distance between the mobile computing device and one or more of the target object and a marker object;
  determining, via at least one sensor of the mobile computing device, one or more of a time of the at least one image and a location of the at least one image;
  determining, via at least one processor of the mobile computing device, at least one dimension of the target object based on one or more of the image, the distance information, and a known dimension corresponding to the marker object, the dimension including at least one of a length, a height, a width, a volume, and an estimated weight;
  detecting, via the processor, at least one object identifier corresponding to the target object based on the at least one image, the object identifier including at least one of a barcode, a QR code, an RFID code, a text string, a brand identifier, and a design element;
  associating, via the processor, object data with the target object based on one or more of the at least one image, the dimension, the time, the location, reference data, and the object identifier, the associated object data including one or more of a count, a fragility status, a prior shipping status, a shipping origin, a shipping destination, a damage status, and a brand;
  displaying, via a touchscreen of the mobile computing device, at least one of the captured image, the determined dimension, and the associated object data; and
  generating, based on the associated object data, one or more object instructions corresponding to the target object, the object instructions including one or more of a shipping assignment, a storage assignment, a restocking order, and an inventory report.

9. The method of claim 8, further comprising:
  modifying the at least one dimension based on at least one icon displayed via the touchscreen, the at least one icon positionable by the user via the touchscreen.

10. The method of claim 9, wherein modifying the at least one dimension based on at least one icon displayed via the touchscreen, the at least one icon positionable by the user via the touchscreen object includes:
  selecting the target object from one or more candidate objects by positioning the at least one icon via the touchscreen.

11. The method of claim 8, further comprising:
  generating, via the at least one processor, at least one of a 3D model of the first object and a holographic image of the first object based on one or more of the at least one image and the distance information.

12. The method of claim 11, further comprising:
  displaying the at least one holographic image via at least one augmented reality device wirelessly connected to the mobile computing device;
  detecting, via the at least one augmented reality device, at least one of an eye movement of the user, a gesture of the user, and an audio command; and
  adjusting the at least one holographic image based on at least one of the eye movement, the gesture, and the audio command.

13. The method of claim 8, wherein determining, via the at least one processor, object data associated with the at least one first object based on one or more of the at least one image, the distance information, the dimension, the volume, and the dimension weight determining associating, via the at least one processor, object data with the target object based on one or more of the at least one image, the dimension, the time, the location, reference data, and the object identifier, the associated object data including one or more of a count, a fragility status, a prior status, a shipping origin, a shipping destination, a damage status, a shipping history, and a brand includes:
  determining the associated object data by decoding the at least one object identifier.

14. The method of claim 8, wherein determining, via the at least one processor, object data associated with the at least one first object based on one or more of the at least one image, the distance information, the dimension, the volume, and the dimension weight determining associating, via the at least one processor, object data with the target object based on one or more of the at least one image, the dimension, the time, the location, reference data, and the object identifier, the associated object data including one or more of a count, a fragility status, a prior status, a shipping origin, a shipping destination, a damage status, a shipping history, and a brand includes:

determining-the associated object data by comparing one or more of the at least one image, the dimension, the time, the location, reference data, and the object identifier to the reference data, the reference data one of a) stored in a memory of the mobile computing device and b) located remotely from, and wirelessly linked to, the mobile computing device.

15. The method of claim 8, wherein performing at least one of a value determination of the first object and a shipping determination of the first object based on one or more of the at least one image, the distance information, the dimension, the volume, and the dimension weight the shipping assignment and the storage assignment include at least one of:

assigning the target object to one or more of a shipping vehicle and a storage location;

assigning the target object to one or more of a subdivision of the shipping vehicle and a subdivision of the storage location, the subdivision including at least one of a shelf, a room, and a compartment;

determining whether the target object may be stacked atop a neighbor object; and determining whether a third object may be stacked atop the target object based on one or more of the at least one image, the distance information, the dimension, the volume, and the dimension weight.

16. The method of claim 12, wherein determining, via the at least one processor, object data associated with the at least one first object based on one or more of the at least one image, the distance information, the dimension, the volume, and the dimension weight includes:

detecting, via the at least one augmented reality device, at least one object identifier of the first object from the at least one image based on at least one of the eye movement, the gesture, and the audio command; and determining, via the at least one processor, object data associated with the at least one first object by decoding the at least one object identifier.

\* \* \* \* \*